Jan. 1, 1935. H. G. RHODES 1,986,763
HYDRAULIC BRAKE
Filed March 9, 1931
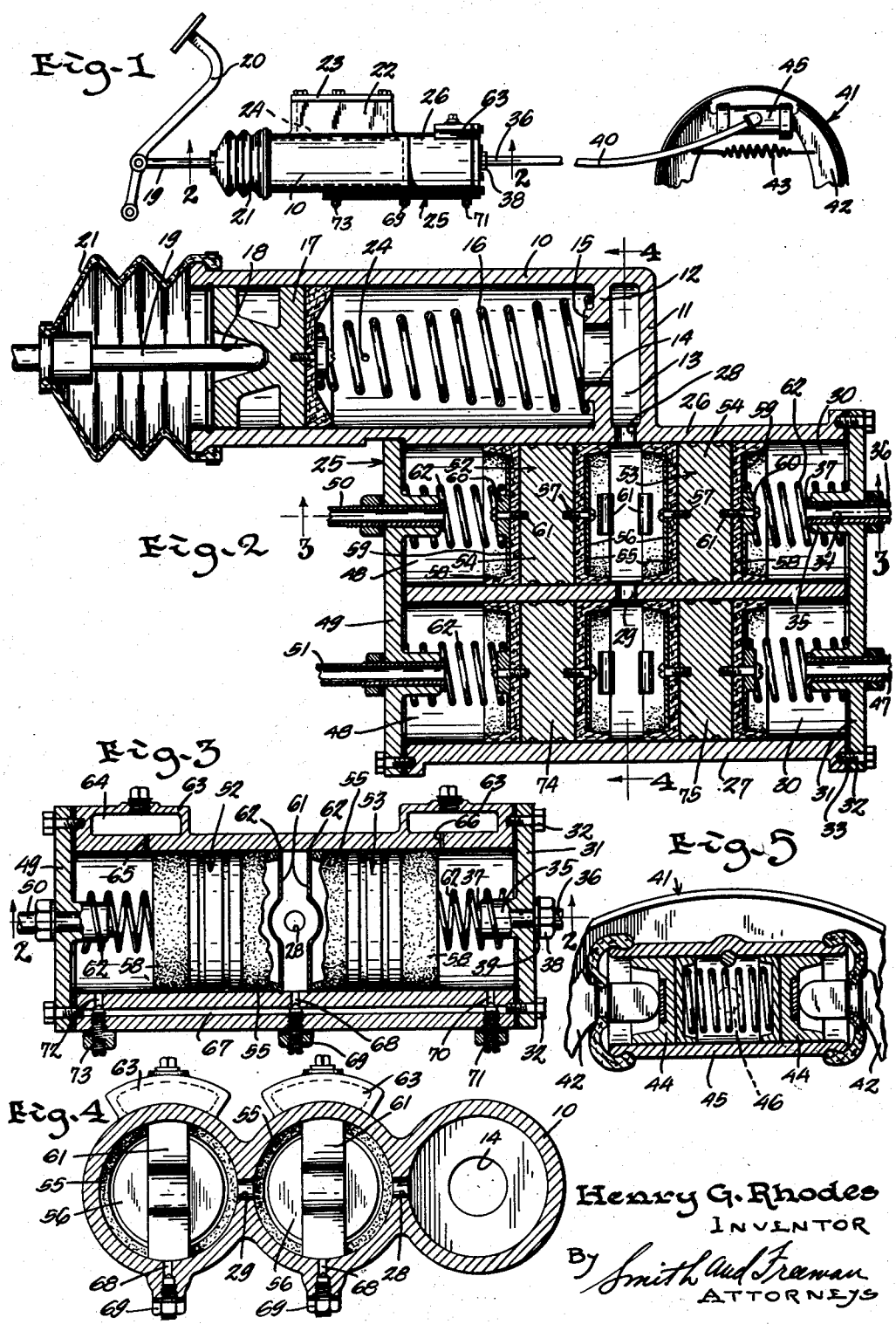
Henry G. Rhodes
INVENTOR
By Smith and Freeman
ATTORNEYS Patented Jan. 1, 1935

1,986,763

UNITED STATES PATENT OFFICE 1,986,763

HYDRAULIC BRAKE

Henry G. Rhodes, Mayfield Heights, Ohio, assignor of one-half to Victor F. Germ, Lyndhurst, Ohio Application March 9, 1931, Serial No. 521,148

7 Claims. (Cl. 60—54.5)

This invention relates to hydraulic brakes, more particularly adapted for automobiles, and an object of the invention is to provide new and improved devices of this type.

In the drawing accompanying this specification and forming a part of this application, I have shown for purposes of illustration, one form which my invention may assume, and in this drawing:

Figure 1 is a fragmentary side elevational view of an embodiment of the invention, Figure 2 is an enlarged horizontal sectional view corresponding substantially to the line 2—2 of Figure 1, Figure 3 is a vertical sectional view corresponding substantially to the line 3—3 of Figure 2, Figure 4 is a vertical sectional view corresponding substantially to the line 4—4 of Figure 2, while Figure 5 is an enlarged fragmentary vertical sectional view of the wheel brake cylinder and pistons.

The embodiment of the invention herein disclosed comprises a master cylinder 10, having adjacent one end 11 an interior partition 12 forming a chamber 13, communicating with the cylinder 10 through an opening 14, surrounded by a rib 15, providing a seat for one end of a spring 16, the opposite end of which bears upon a piston 17 slidably disposed in the cylinder 10. The piston 17 at its outer side is provided with a recess 18 adapted for the reception of the inner end of a piston rod 19, connected to a brake pedal 20, and attached to the cylinder 10 and the piston rod 19 is a collapsible sealing member 21. Above the master cylinder 10 and integral thereof is a storage reservoir 22, having a removable cover 23, and communicating by means of a port 24 with the cylinder 10.

Preferably cast with one side of the master cylinder 10 is a brake actuating device, indicated generally by the reference character 25, and in the embodiment shown comprising two cylinders 26 and 27 arranged in tandem, communicating with the cylinder 10 through the port 28, and communicating with each other through the port 29.

One pair of ends 30 of the cylinders 26 and 27 are closed by a common plate 31, secured in position by screws 32, with suitable interposed packing 33, and the plate 31 is provided with an opening 34 arranged axially in line with the cylinder 26 and having an inwardly extending boss 35 therearound, through which extends a fitting 36 having a flange 37 bearing against the end of the boss 35, and outwardly of the plate 31 threaded for the reception of a securing nut 38, with interposed packing 39, the fitting 36 forming part of a flexible conduit 40 extending to one of the brake devices 41 associated with one of the front wheels of a vehicle, such as shown in Figures 1 and 5 of the drawing, and which comprises brake shoes 42 normally held disengaged by a spring 43, adapted to be engaged by a pair of opposed pistons 44, carried in a cylinder 45, and operatively disposed to bear against the ends of the brake shoes 42 when fluid is admitted to the cylinder 45 through the port 46 from the conduit 40. A second conduit 47 communicates axially with the adjacent end of the cylinder 27 through the plate 31 in the same manner as described in connection with the conduit 40, the conduit 47 leading to a brake device similar to 41 heretofore described, such device however being associated with one of the rear wheels of the vehicle. The opposite pair of ends 48 of the cylinders 26 and 27 likewise are closed by a common plate 49, having a conduit 50 communicating with the cylinder 26 leading to the other front wheel brake device of the vehicle, and a conduit 51 communicating with the cylinder 27 and leading to the other rear wheel brake device of the vehicle, the conduits 50 and 51, and the brake devices adjacent the wheels being of the character heretofore described in detail.

Slidably mounted in the cylinder 26 is a pair of pistons 52 and 53, each comprising a disk 54 to the inner surface of which is secured a cup-shaped washer 55 held by a plate 56 secured by a screw 57, and the opposite face of the disk 54 has an oppositely disposed washer 58 secured thereto, held in position by a plate 59, provided with a boss 60, and secured by a screw 61. A coiled expansion spring 62 is interposed between the plate 59 and the plate 31 and surrounds the bosses 35 and 60, and normally urges the piston 53 toward the piston 52, and since both piston constructions are the same, the pistons 52 and 53 are normally urged toward each other, but are limited in this movement by a pair of spaced resilient stop strips 61ª supported in notches 62ª formed in the interior wall of the cylinder 26, and the port 28 is so located as to afford communication with the cylinder 26 only between the pistons 52 and 53.

Auxiliary reservoirs 63 are provided for the cylinder 26, and each comprises an integral enlargement having a chamber 64, one reservoir having a duct 65 communicating with the cylinder 26 between the piston 52 and the adjacent plate 49 and the other having a duct 66 communicating with the cylinder 26 between the piston 53 and the plate 31, the ducts 65 and 66 being positioned to be open when the pistons 52 and 53 are retracted, but to be closed by said pistons immediately pressure is placed thereon.

The cylinder 26 is also provided with a by-pass 67 communicating by a port 68, controlled by a needle valve 69, with the space betwen the pistons 52 and 53, communicating also by a port 70, controlled by a needle valve 71, with the space between the piston 53 and the plate 31, and additionally communicating by a port 72, controlled by a needle valve 73, with the space between the piston 52 and the plate 49, and the cylinder 27 is provided with a similar arrangement.

The pistons 74 and 75 in the cylinder 27 and associated construction shown, are identical to those described in connection with the cylinder 26, and the cylinder 27 and pistons 74 and 75 operate in tandem with the cylinder 26 and pistons 52 and 53, communication being provided through the port 29, as will be understood.

In preparing the system for use the needle valves 69, 71, and 73 are operated to open the ports 68, 70, and 72, and fluid is introduced into the system through the reservoir 22, flowing thence through the port 24, into the master cylinder 10, thence through the port 28, through the port 29, through the by-pass 67 of each of the cylinders 26 and 27, passing thence into the ends of the cylinders 26 and 27, thence through the conduits 40, 47, 50, and 51, to the brake cylinders 45, sufficient fluid being introduced to entirely fill the system, and the reservoirs 63 and 22 as well. When filling has been completed the needle valves 69, 71, and 73 are screwed home to close the ports 68, 70, and 72, thereby separating the fluid in the system into segregated bodies, that contained within the reservoir 22, the master cylinder 10, and the spaces between the pistons 52 and 53 of the cylinder 26 and pistons 74 and 75 of the cylinder 27, on the one hand, and those contained between the outer faces of the pistons 52 and 53 of the cylinder 26, and the pistons 74 and 75 of the cylinder 27, and adjacent end walls of said cylinders, and in the conduits 40, 47, 50, and 51, and in the cylinders 45, on the other hand, so that the first body of fluid has no communication with the individual bodies associated with each brake device.

Normally the piston 17 is held retracted by the spring 16 and the pistons 52, 53, 74, and 75 are likewise held retracted by the springs 62, and the brake shoes are held retracted by springs 43; and normally the fluid in the system is free from pressure. When the pedal 20 is depressed, the piston 17 forces fluid from the master cylinder between the pistons 52 and 53 in the cylinder 26 and pistons 74 and 75 in the cylinder 27, thus causing outward movement of the latter pistons which force the fluid in advance of these pistons to the cylinders 45 to effect operation of the pistons 44 and thus expand the brake devices 41.

In the embodiment described the entire system is equalized throughout and equalized pressure may be transmitted to the brake devices associated with all four wheels of the vehicle, and by reason of the segregation of the body of fluid contained within the master cylinder 10, such body of fluid can never be diminished by breakage or leakage in any of the flexible connections 40, 47, 50, and 51; consequently no fluid can be lost from the master cylinder 10 by reason of such breakage or leakage.

Should one of the flexible connections, flexible connection 40 for instance, leak, and only some fluid escape by reason of leakage, additional fluid will be supplied by the reservoir 63 to compensate for such leakage as may occur, and consequently prevent any impairment of the braking efficiency of the system. Should one of the flexible conduits, again 40, for example, entirely break, so as to permit all of the fluid in the conduit and adjacent end of the cylinder 26 to escape, the piston 53, when pressure is applied to the pedal 20, will move to its extreme outer position, and will be returned by the spring 62, in the same manner as though the fluid had not been lost, and without affecting equalization on the remaining three brake devices. In other words only one of the brake devices will be cut out and only that portion of fluid directly acting with reference to said braking device lost. Should the flexible connection 50, as well as the flexible connection 40, break, the piston 52 will move to its extreme outer limit, and only the portion of fluid directly associated therewith will be lost, this without affecting the equalized operation of the brake devices of the remaining two wheels of the vehicle, the reserve in the reservoir 22 compensating for the additional movement of the piston 52. Should still another conduit, 47 for example, also break, there still will be one brake device operative, as will be understood. During any or all of the breakage which might occur as heretofore discussed, none of the major portion of the fluid contained within the reservoir 22, master cylinder 10, and between the pistons 52 and 53 of the cylinder 26 and piston 74 and 75 of the cylinder 27 will be lost.

Under the circumstances entire safety is provided, absolute equalization of pressure being obtained upon the brake devices so long as two or more are in operation, leakage in individual conduits may readily be taken care of, and breakage in a conduit or conduits results in the loss of a small localized body of fluid directly associated with the conduit in which breakage occurs.

Thus it will be apparent to those skilled in the art that I have accomplished at least the principal object of my invention, and it will be appreciated that the invention is susceptible to uses and has advantages other than those herein pointed out, and may be variously changed and modified without departing from the spirit of the invention; accordingly those skilled in the art will realize that the embodiment herein disclosed is illustrative only and that the invention is not limited thereto.

I claim:

1. A hydraulic brake system, comprising: a casting having a main cylinder, and a pair of auxiliary cylinders arranged side by side and having a common wall therebetween; a main piston reciprocally mounted in said main cylinder; a pair of auxiliary pistons disposed within each of said auxiliary cylinders, spaced from each other and confined to reciprocation within a portion only thereof; a duct in the wall common to said auxiliary cylinders, communicating with said auxiliary cylinders in the space between said auxiliary pistons; a duct in the wall of one of said auxiliary cylinders, communicating with said main cylinder and with the space between the auxiliary pistons in said one auxiliary cylinder; brake operating devices; a first body of fluid being normally confined between said main piston and one side of each of said auxiliary pistons, and independent second bodies of fluid being normally confined between said brake operating devices and the opposite sides of said auxiliary pistons; said casting having a plurality of reservoirs, each arranged side by side with each of said auxiliary cylinders adjacent the opposite ends thereof, and having a common wall therebetween; and a duct for each of said reservoirs, disposed in the latter common walls, each duct communicating with one of said reservoirs and with its associated second body of fluid, whereby said reservoirs automatically operate to replenish deficiency of fluid in said second bodies of fluid; and braking action of said main piston transmits fluid pressure to said brake operating devices to effect braking of the same.

2. A hydraulic brake system, comprising: a casting having a main cylinder and an auxiliary cylinder arranged side by side and having a common wall therebetween, said auxiliary cylinder having a wall continuous with said common wall and projecting beyond one end of said main cylinder, said main cylinder having a wall continuous with said common wall and projecting beyond one end of said auxiliary cylinder; a main piston reciprocally mounted in said main cylinder; a pair of auxiliary pistons disposed within said auxiliary cylinder, spaced from each other and confined to reciprocation within a portion only thereof; a duct in said common wall, communicating with said main cylinder and with the space between the auxiliary pistons in said one auxiliary cylinder; brake operating devices, each communicating with opposite ends of said auxiliary cylinders; a first body of fluid being normally confined between said main piston and one side of each of said auxiliary pistons, and independent second bodies of fluid being normally confined between said brake operating devices and the opposite sides of said auxiliary pistons; said casting having a pair of reservoirs one arranged at each end of said auxiliary cylinder, and having a common wall therebetween; and a duct for each of said reservoirs, disposed in the latter common wall, each duct communicating with one of said reservoirs and its associated second body of fluid, whereby said reservoirs automatically operate to replenish deficiency of fluid in said second bodies of fluid; and braking action of said main piston transmits fluid pressure to said brake operating devices to effect braking of the same.

3. A hydraulic brake system, comprising: a main cylinder containing a main piston; an auxiliary cylinder having a port intermediate its ends communicating with said main cylinder; a pair of auxiliary pistons disposed in said auxiliary cylinder, and spaced from each other on opposite sides of said port; a first body of fluid being normally confined between said main piston and one side of said auxiliary pistons; brake operating devices each communicating with the ends of said auxiliary cylinder; a pair of second bodies of fluid being normally confined between the other side of said auxiliary pistons and said associated brake operating devices; said auxiliary pistons preventing fluid communication therepast, segregating said first body of fluid from said second bodies of fluid; and an auxiliary reservoir for each of said second bodies of fluid, mounted on said auxiliary cylinder at the ends thereof, and automatically operable to replenish deficiency of fluid in said second bodies of fluid; and braking action of said main piston transmits fluid pressure to said two auxiliary pistons, spreading apart said two auxiliary pistons, each of the latter transmitting fluid pressure to its associated brake operating devices to effect braking of the same.

4. A hydraulic brake system, comprising: a main cylinder containing a main piston; an auxiliary cylinder having a port intermediate its ends communicating with said main cylinder; a pair of auxiliary pistons disposed in said auxiliary cylinder, and spaced from each other on opposite sides of said port; a first body of fluid being normally confined between said main piston and one side of said auxiliary pistons; brake operating devices each communicating with the ends of said auxiliary cylinder; a pair of second bodies of fluid being normally confined between the other side of said auxiliary pistons and said associated brake operating devices; said auxiliary pistons preventing fluid communication therepast, segregating said first body of fluid from said second bodies of fluid; an auxiliary reservoir for each of said second bodies of fluid, mounted on said auxiliary cylinder at the ends thereof, and automatically operable to replenish deficiency of fluid in said second bodies of fluid; a by-pass communicable with said first body and said second bodies of fluid; a valve in said by-pass for each of said second bodies of fluid, each valve subjected only to fluid pressure in its associated second body of fluid; a valve in said by-pass for said first body of fluid, subjected only to fluid pressure in said first body of fluid; said valves being operable to establish fluid communication from said first body of fluid to any one of said second bodies of fluid to thereby replenish deficiency of fluid in any one of said auxiliary reservoirs and any one of said second bodies of fluid; and braking action of said main piston transmits fluid pressure to said two auxiliary pistons, spreading apart said two auxiliary pistons, each of the latter transmitting fluid pressure to its associated brake operating devices to effect braking of the same.

5. A hydraulic brake system, comprising: a casting having a main cylinder, and a pair of auxiliary cylinders arranged side by side and having a common wall therebetween; a pair of auxiliary pistons disposed within each of said auxiliary cylinders, spaced from each other and confined to reciprocation within a portion only thereof; a duct in the wall common to said auxiliary cylinders, communicating with said auxiliary cylinders in the space between said auxiliary pistons; a duct in the wall of one of said auxiliary cylinders, communicating with said main cylinder and with the space between the auxiliary pistons in said one auxiliary cylinder; brake operating devices communicating with said auxiliary cylinders; a first body of fluid being normally confined between said main piston and one side of each of said auxiliary pistons, and independent second bodies of fluid being normally confined between said brake operating devices and the opposite sides of said auxiliary pistons; said casting having a plurality of reservoirs, each arranged side by side with each of said auxiliary cylinders adjacent the opposite ends thereof, and having a common wall therebetween; and a duct for each of said reservoirs, disposed in the latter common walls, each duct communicating with one of said reservoirs and with its associated second body of fluid, whereby said reservoirs automatically operate to replenish deficiency of fluid in said second bodies of fluid; a by-pass drilled out of said casting, longitudinally of each of said auxiliary cylinders, communicable with said first body and said second bodies of fluid; a valve in said bypass for each of said second bodies of fluid, each valve subjected only to fluid pressure in its associated second body of fluid; a valve in said bypass for said first body of fluid, subjected only to fluid pressure in said first body of fluid; said valves being operable to establish fluid communication from said first body of fluid to any one of said second bodies of fluid, to thereby replenish deficiency of fluid in any one of said auxiliary reservoirs and any one of said second bodies of fluid; and braking action of said main piston transmits fluid pressure to said brake operating devices to effect braking of the same.

6. In a hydraulic brake system, a main cylinder containing a main piston; an auxiliary cylinder of constant diameter throughout its length, and having a port intermediate its ends communicating with said main cylinder; a pair of auxiliary pistons disposed in said auxiliary cylinder, and spaced from each other, and each confined to reciprocation within a portion only thereof; a first body of fluid being normally confined between said main piston and one side of said auxiliary pistons; a stop for each of said auxiliary pistons disposed diametrically in said auxiliary cylinder adjacent to said port therein, each stop operating to prevent its associated auxiliary piston from obstructing said port; and brake operating devices, each communicating with said auxiliary cylinder adjacent the opposite sides of said auxiliary pistons; a second body of fluid being normally confined between said auxiliary pistons and said brake operating devices; said auxiliary pistons preventing fluid communication therepast, segregating said first and second bodies of fluid; whereby braking action of said main piston transmits fluid pressure to said brake operating devices to effect braking of the same.

7. In a hydraulic brake system, a main cylinder containing a main piston; an auxiliary cylinder of constant diameter throughout its length, and having a port intermediate its ends communicating with said main cylinder, said auxiliary cylinder having a pair of diametrically disposed notches at each side of said port; a pair of auxiliary pistons disposed in said auxiliary cylinder, and spaced from each other, and each confined to reciprocation within a portion only thereof; a first body of fluid being normally confined between said main piston and one side of said auxiliary pistons; a resilient stop for each of said auxiliary pistons initially sprung into position in the notches in said auxiliary cylinder adjacent to said port therein, each resilient stop operating to prevent its associated auxiliary piston from obstructing said port; and brake operating devices, each communicating with said auxiliary cylinder adjacent the opposite sides of said auxiliary pistons; a second body of fluid being normally confined between said auxiliary pistons and said brake operating devices, said auxiliary pistons preventing fluid communication therepast, segregating said first and second bodies of fluid; whereby braking action of said main piston transmits fluid pressure to said brake operating devices to effect braking of the same.

HENRY G. RHODES.